(12) United States Patent
Mudusuru et al.

(10) Patent No.: US 9,563,437 B2
(45) Date of Patent: Feb. 7, 2017

(54) TECHNOLOGIES FOR PRE-MEMORY PHASE INITIALIZATION OF A COMPUTING DEVICE

(71) Applicant: Intel Corporation, Santa Clara, CA (US)

(72) Inventors: Giri P. Mudusuru, Portland, OR (US); Rangasai V. Chaganty, Hillsboro, OR (US); Chasel Chiu, New Taipei (TW); Satya P. Yarlagadda, Bangalore (IN); Nivedita Aggarwal, Bangaloreii (IN); Nuo Zhang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 14/318,129

(22) Filed: Jun. 27, 2014

(65) Prior Publication Data
US 2015/0378747 A1 Dec. 31, 2015

(51) Int. Cl.
*G06F 9/00* (2006.01)
*G06F 15/177* (2006.01)
*G06F 9/44* (2006.01)

(52) U.S. Cl.
CPC .................................. *G06F 9/4403* (2013.01)

(58) Field of Classification Search
CPC ..................................................... G06F 9/4403
USPC ........................................................... 713/2
See application file for complete search history.

(56) References Cited

U.S. PATENT DOCUMENTS

| | | | | |
|---|---|---|---|---|
| 8,352,718 B1* | 1/2013 | Rao | ........................... | G06F 9/00 711/118 |
| 2006/0271778 A1* | 11/2006 | Lee | ........................ | G06F 9/4401 713/2 |
| 2007/0055856 A1* | 3/2007 | Zimmer | ................ | G06F 9/4403 713/2 |
| 2013/0013905 A1* | 1/2013 | Held | ...................... | G06F 21/575 713/2 |

* cited by examiner

*Primary Examiner* — Robert Cassity
(74) *Attorney, Agent, or Firm* — Barnes & Thornburg LLP

(57) ABSTRACT

Technologies for pre-memory phase initialization include a computing device having a processor with a cache memory. The computing device may determine whether a temporary memory different from the cache memory of the processor is present for temporary memory access prior to initialization of a main memory of the computing device. In response to determining that temporary memory is present, a portion of the basic input/output instructions may be copied from a non-volatile memory of the computing device to the temporary memory for execution prior to initialization of the main memory. The computing device may also initialize a portion of the cache memory of the processor as Cache as RAM for temporary memory access prior to initialization of the main memory in response to determining that temporary memory is not present. After initialization, the main memory may be configured for subsequent memory access. Other embodiments are described and claimed.

21 Claims, 4 Drawing Sheets

US 9,563,437 B2

TECHNOLOGIES FOR PRE-MEMORY PHASE INITIALIZATION OF A COMPUTING DEVICE

BACKGROUND

Modern computing devices have become ubiquitous tools for personal, business, and social uses. As a result, the number and complexity of features provided by such computing devices continues to increase. Many of those features rely on platform-specific functionality provided by basic input/output (BIOS) and/or firmware components of the computing devices. As such, the increase in the number and complexity of the features provided by modern computing devices has caused the size of BIOS code and/or firmware components to increase as well.

During early initialization of a computing device, the BIOS and/or firmware often needs an amount of temporary storage to perform boot operations. Additionally, various components of the computing device require an amount of temporary storage and/or a stack to be initialized. In some cases, the boot operations are performed and/or the components are initialized before the main system memory of the computing device is available. As such, the BIOS and/or firmware of some computing devices initialize a portion of processor cache memory as temporary RAM, or "Cache as RAM." Cache as RAM may be used to temporarily store data and variables prior to initialization of the main system memory. However, the total size of the data and variables that may be temporarily stored in the Cache as RAM is effectively limited by the size of the cache memory of the processor. As such, the amount of temporary storage available via Cache as RAM is beginning to reach capacity as the size of BIOS code and/or firmware increases.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
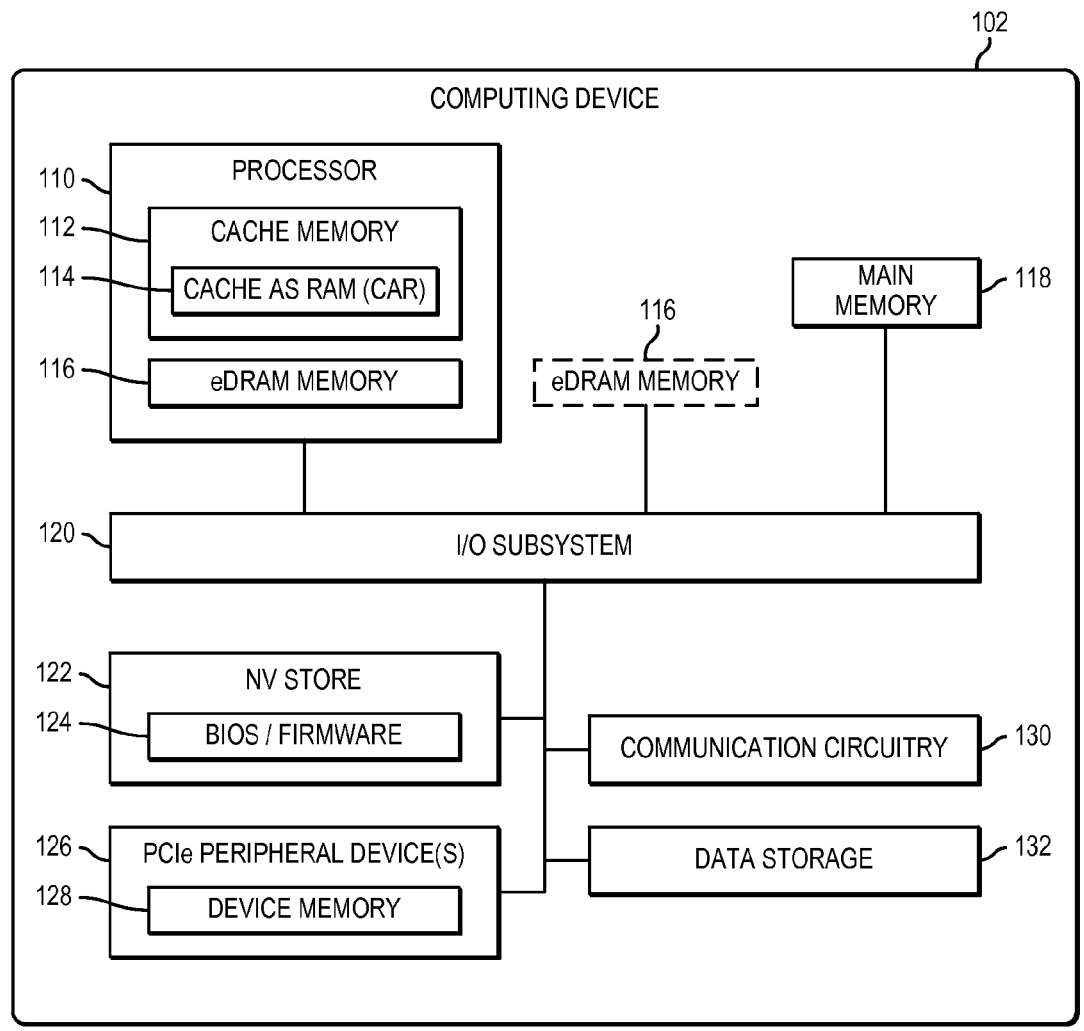
FIG. 1 is a simplified block diagram of at least one embodiment of a computing device for pre-memory phase initialization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment a computing device 102 includes a processor 110 having a cache memory 112 for temporarily storing code (e.g., instructions, commands, etc.) and/or data (e.g., configuration settings, variables, device state data, etc.) needed during initial stages of the booting process of the computing device 102 or a component thereof. For example, in some embodiments, a portion the basic input/output (BIOS) instructions and/or firmware instructions 124 required to boot the computing device 102 may be temporarily stored in the cache memory 112 prior to initialization of a main memory 118 of the computing device 102. In use, the computing device 102 is configured to determine whether a temporary memory other than the cache memory 112 is available to temporarily store the portion of the BIOS and/or firmware instructions 124. In some embodiments, the computing device 102 determines whether embedded dynamic random-access memory (eDRAM) 116 is available to temporarily store the portion of the BIOS and/or firmware instructions 124 instead of the cache memory 112. If so, the eDRAM 116 is initialized to temporarily store the portion of the BIOS and/or firmware instructions 124 until initialization of the main memory 118 has been completed. If the computing device 102 determines instead that eDRAM 116 is not available, the computing device 102 determines whether a Peripheral Component Interconnect Express (PCIe) memory 128 is available for temporary storage. If so, the PCIe device memory 128 is initialized to temporarily store the portion of the BIOS and/or firmware instructions 124 until initialization of the main memory 118 has been completed. If the computing device 102 determines that neither the eDRAM 116 nor the PCIe device memory 128 are available for temporary storage, the computing device 102 initializes a portion of the cache memory 112 as cache as RAM to temporarily store the portion of the BIOS and/or firmware instructions 124 until initialization of the main memory 118 has been completed. After initialization of the main memory 118 has been completed, the computing device 102 configures the main memory 118 for storage of subsequent memory accesses (e.g., subsequent storage, execution, and/or retrieval of code and/or data).

The computing device 102 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. The illustrative computing device 102 includes the processor 110, the main memory 118, an input/output (I/O) subsystem 120, a non-volatile ("NV") store 122, one or more Peripheral Component Interconnect Express (PCIe) devices 126, communication circuitry 130, and a data storage 132. Of course, the computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the main memory 118, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The processor 110 may include a cache memory 112 for storing instructions and/or data for execution. The cache memory 112 may be embodied as static random-access memory (SRAM) or any other type of volatile or non-volatile memory or data storage capable of performing the functions described herein. In some embodiments, as discussed in more detail below, a portion of the cache memory 112 may be initialized as Cache as RAM (CAR) 114. In such embodiments, the CAR 114 may be used by components of the computing device 102 to store code and/or data needed during the booting process before the main memory 118 (e.g., the main device memory) has been fully initialized. In some embodiments, the CAR 114 may be initialized for storage of data prior to initialization of the main memory 118 based on a determination that the computing device 102 does not include other types of temporary memory (e.g., the eDRAM 116 and/or the PCIe device memory 128). In other embodiments, the CAR 114 may be initialized for storage of data prior to initialization of the main memory 118 based on a determination that the temporary memory (e.g., the eDRAM 116 and/or the PCIe device memory 128), when included in the computing device 102, does not have enough storage capacity to store the code and/or data needed to boot or otherwise provide pre-memory phase functionality and/or features to the computing device 102.

In some embodiments, the processor 110 may also include embedded dynamic random-access memory (eDRAM) 116. The illustrative eDRAM 116 is a separate memory of the processor 110 and/or the computing device 102. That is, the eDRAM 116 is a memory different from the cache memory 112 of the processor 110. As discussed in more detail below, the eDRAM 116 may be initialized for storing code and/or data needed during the initial booting process before the main memory 118 (e.g., the main device memory) has been initialized. It should be appreciated that in some embodiments, the eDRAM 116 may not be internal to the processor 110. For example, in some embodiments, the eDRAM 116 may be external to the processor 110 as shown in dashed line in FIG. 1. In such embodiments, the external eDRAM 116 may be communicatively coupled to the processor 110 via the I/O subsystem 120. Of course, it should be appreciated that the computing device 102 may include eDRAM 116 both internal and external to the processor 110.

The main memory 118 may be embodied as any type of volatile or non-volatile memory or data storage capable of performing the functions described herein. In operation, the main memory 118 may store various data and software used during operation of the computing device 102 such as operating systems, applications, programs, libraries, and drivers. The main memory 118 is communicatively coupled to the processor 110 via the I/O subsystem 120, which may be embodied as circuitry and/or components to facilitate input/output operations with the processor 110, the main memory 118, and other components of the computing device 102. For example, the I/O subsystem 120 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SoC) and be incorporated, along with the processor 110, the main memory 118, and other components of the computing device 102, on a single integrated circuit chip.

The computing device 102 further includes the non-volatile ("NV") store 122 (e.g., non-volatile memory). The NV store 122 may be embodied as any device configured for persistent storage of data when the computing device 102 is powered down or disconnected from a power supply. In the illustrative embodiment, the NV store 122 is embodied as a flash memory chip. In other embodiments, the NV store 122 may be embodied as a small amount of complementary metal-oxide semiconductor (CMOS) memory coupled with a battery backup or other non-volatile memory. In such embodiments, the NV store 122 typically has a relatively small storage capacity compared to the data storage 132, but is available to the computing device 102 upon initial boot. Additionally, in some embodiments, the NV store 122 may be incorporated into one or more other components of the computing device 102, for example into the I/O subsystem 120.

The NV store 122 (e.g., the non-volatile memory) may be used to store platform firmware for the computing device 102, as well as firmware configuration variables such as configuration settings, boot targets, and other information that should persist across reboots. For example, in the illustrative embodiment, the NV store 122 is configured to store BIOS and/or firmware instructions 124 for booting or otherwise initializing a platform and/or an operating system (OS) of the computing device 102. In some embodiments, the BIOS and/or firmware instructions 124 include low-level system code that when executed by the processor 110, causes one or more components of the computing device 102 to be initialized and/or one or more platform initialization functions to be performed. For example, in some embodiments, execution of one or more of the BIOS and/or the firmware instructions 124 causes the processor 110 to initialize the eDRAM 116 and/or PCIe device memory 128 as temporary random-access memory (RAM), which as discussed below, may be used for temporarily storing code (e.g., BIOS instructions, commands, etc.) and/or data (e.g., configuration settings, variables, device state data, etc.) prior to complete initialization of the main memory 118. Additionally or alternatively, in embodiments wherein the computing device 102 does not include temporary memory (e.g., the eDRAM 116 and/or the PCIe device memory 128), execution of one or more of the BIOS and/or the firmware instructions 124 causes the processor 110 to initialize a portion of the cache memory 112 as CAR 114 for temporarily storing the code and/or data prior to complete initialization of the main memory 118.

In some embodiments, the computing device 102 includes one or more Peripheral Component Interconnect Express (PCIe) devices 126. The PCIe device(s) 126 may be embodied as any type of storage device (e.g., solid-state drives, USB flash drives, memory cards, etc.), media reading devices (e.g., memory card readers, etc.), video devices (e.g., internal or external graphics processing units, video input cards, etc.), I/O devices (e.g., data transfer adapters, network adapters, wireless communication cards, wireless cellular modems, etc.), audio devices (e.g., sound output cards, audio input cards, etc.), or any other device and/or component that may be added to or communicatively coupled to the computing device 102. The PCIe devices 126 may be embodied as one or more expansion cards internal to the computing device 102. In some embodiments, the PCIe devices 126 may be embodied as one or more external components and/or devices communicatively coupled to the computing device 102 via a suitable interface. In either case, the PCIe devices 126 may be communicatively coupled to the processor 110 via a PCIe I/O bus (not shown), which may form part of the I/O subsystem 120 and/or a separate component of the computing device 102. In some embodiments, one or more of the PCIe devices 126 may include embedded memory (e.g., the PCIe device memory 128). The PCIe device memory 128 is a memory different from the cache memory 112 of the processor 110 and the eDRAM 116. As discussed in more detail below, the PCIe device memory 128 may be initialized for storing code and/or data needed during the booting process before the main memory 118 (e.g., the main device memory) has been initialized. In some embodiments, the PCIe device memory 128 may be initialized for storage of data prior to initialization of the main memory 118 based on a determination that the computing device 102 does not include the eDRAM 116. In other embodiments, the PCIe device memory 128 may be initialized for storage of data prior to initialization of the main memory 118 based on a determination that the eDRAM 116, when included in the computing device 102, does not have enough storage capacity to store the code and/or data needed to boot or otherwise provide pre-memory phase functionality and/or features to the computing device 102.

The communication circuitry 130 of the computing device 102 may be embodied as any type of communication circuit, device, or collection thereof, capable of enabling communications between the computing device 102 and one or more other computing devices. The communication circuitry 130 may be configured to use any one or more communication technologies (e.g., wireless or wired communications) and associated protocols (e.g., Ethernet, Wi-Fi®, WiMAX, etc.) to effect such communication.

The data storage 132 may be embodied as any type of device or devices configured for short-term or long-term storage of data such as, for example, memory devices and circuits, memory cards, hard disk drives, solid-state drives, or other data storage devices. For example, the data storage 132 may be configured to store one or more operating systems to be initialized and/or executed by the computing device 102. In some embodiments, portions of the operating system(s) may be copied to the main memory 118 during operations for faster processing and/or any other reason.

Figure 2:
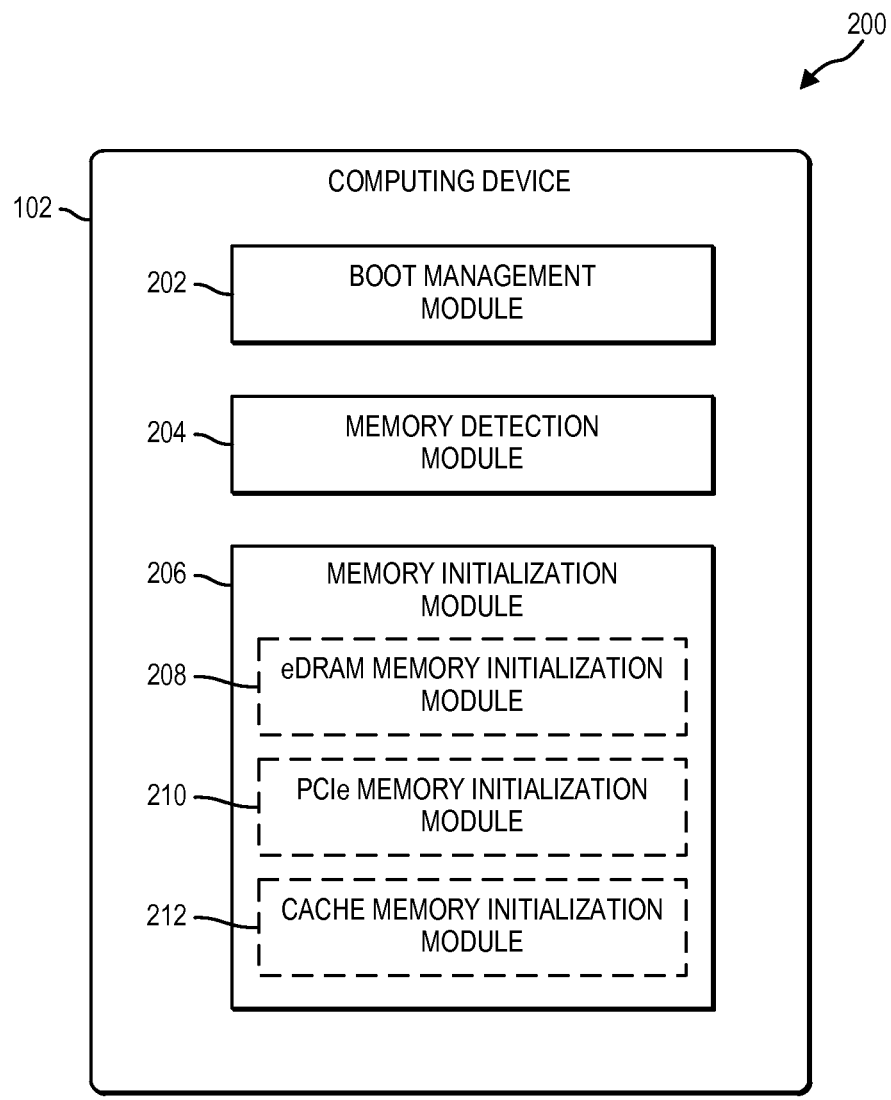
FIG. 2 is a simplified block diagram of at least one embodiment of an environment of the computing device of FIG. 1.

Referring now to FIG. 2, in use, the computing device 102 establishes an environment 200 during operation. The illustrative environment 200 includes a boot management module 202, a memory detection module 204, and a memory initialization module 206. In some embodiments, the memory initialization module 206 may include a eDRAM memory initialization module 208, a PCIe memory initialization module 210, and cache memory initialization module 212. Each of the modules, logic, and other components of the environment 200 may be embodied as hardware, software, firmware, or a combination thereof. In some embodiments, the boot management module 202, the memory detection module 204, and/or the memory initialization module 206 may be established by the processor 110 in response to execution of the BIOS and/or firmware instructions 124 stored in the NV store 122. It should be appreciated that the computing device 102 may include other components, sub-components, modules, and devices commonly found in a computing device, which are not illustrated in FIG. 2 for clarity of the description.

The boot management module 202 may be configured to initialize all or a portion of the processor 110 and/or other components of the computing device 102 based on the BIOS and/or firmware instructions 124 stored in the non-volatile ("NV") store 122 of the computing device 102. For example, in some embodiments, the boot management module 202 may be configured to execute (or cause the execution of) the BIOS and/or firmware instructions 124 stored in the NV store 122. Additionally or alternately, the boot management module 202 may be configured to execute (or cause the execution of) BIOS instructions and/or firmware copied to a temporary memory (e.g., the eDRAM and/or the PCIe device memory 128). In such embodiments, the boot management module 202 may enable basic and/or reduced functionality for the processor 110 and/or other components of the computing device 102 as defined by the BIOS and/or firmware instructions 124.

The memory detection module 204 is configured to determine whether the computing device 102 includes temporary memory different from the cache memory 112 of the processor 110. For example, in the illustrative embodiment, the memory detection module 204 is configured to detect the presence (or absence) of the eDRAM 116 and/or the PCIe device memory 128. To do so, in some embodiments, the memory detection module 204 may be configured to examine one or more capability registers of the processor 110, the computing device 102, and/or the PCIe devices 126 of the computing device 102. It should be appreciated that the memory detection module 204 may use any other process suitable for detecting the presence or absence of the eDRAM 116 and/or the PCIe device memory 128.

The memory initialization module 206 may be configured to initialize all or a portion of the eDRAM 116 to store code and/or data needed during the booting process prior to initialization of the main memory 118 (e.g., the main device memory). To do so, in some embodiments, the memory initialization module 206 may include the eDRAM memory initialization module 208. The eDRAM memory initialization module 208 may be configured to initialize all or a portion of the eDRAM 116 to be used as temporary RAM. To do so, the eDRAM memory initialization module 208 may program or otherwise configure a base address register (BAR) associated with the eDRAM 116 and/or one or more BARs associated with another component of the computing device 102. In doing so, it should be appreciated that memory accesses made prior to complete initialization of the main memory 118 will be temporarily redirected to the eDRAM 116.

The memory initialization module 206 may also be configured to initialize all or a portion of the PCIe device memory 128 to store code and/or data needed during the booting process prior to initialization of the main memory 118. To do so, in some embodiments, the memory initialization module 206 may include the PCIe memory initialization module 210. The PCIe memory initialization module 210 may be configured to initialize all or a portion of the PCIe device memory 128 to be used as temporary RAM. In some embodiments, the PCIe memory initialization module 210 may initialize the PCIe device memory 128 for temporary storage of code and/or data based on a determination that the computing device 102 does not include the eDRAM 116. In other embodiments, the PCIe memory initialization module 210 may initialize the PCIe device memory 128 for temporary storage of the code and/or data based on a determination that the eDRAM 116, when included in the computing device 102, does not have enough storage capacity to store the code and/or data needed to boot or otherwise provide pre-memory phase functionality and/or features to the computing device 102. It should also be appreciated that the PCIe memory initialization module 210 may initialize the PCIe device memory 128 for temporary storage of code and/or data regardless of the presence and/or storage capacity of the eDRAM 116. For example, in some embodiments, it may be preferable for the PCIe memory initialization module 210 to initialize and utilize the PCIe device memory 128 instead of (or in addition to) the eDRAM 116 for temporary storage of the code and/or data. In any case, the PCIe memory initialization module 210 may also be configured to program or otherwise configure a base address register (BAR) associated with the PCIe device memory 128, the PCIe device 126, and/or one or more BARs associated with other components of the computing device 102. In doing so, it should be appreciated that memory accesses made prior to complete initialization of the main memory 118 will be temporarily redirected to the PCIe device memory 128.

The memory initialization module 206 may also be configured to initialize all or a portion of the cache memory 112 of the processor 110 to be used for temporary storage of code and/or data needed during the booting process prior to initialization of the main memory 118. To do so, in some embodiments, the memory initialization module 206 may include the cache memory initialization module 212. The cache memory initialization module 212 may be configured to initialize all or a portion of the cache memory 112 of the processor 110 to be used as Cache as RAM (CAR) 114. As discussed above, the CAR 114 may be used to temporarily store the BIOS and/or firmware instructions 124 prior to complete initialization of the main memory 118 of the computing device 102. In some embodiments, the cache memory initialization module 212 may only initialize the CAR 114 prior to availability of the main memory 118 based on a determination that the computing device 102 does not include other types of temporary memory (e.g., the eDRAM 116 and/or the PCIe device memory 128). In other embodiments, the cache memory initialization module 212 may only initialize the CAR 114 prior to availability of the main memory 118 based on a determination that the temporary memory (e.g., the eDRAM 116 and/or the PCIe device memory 128), when included in the computing device 102, does not have enough storage capacity to store the code and/or data needed to boot or otherwise provide pre-memory phase functionality and/or features to the computing device 102.

Figure 3:
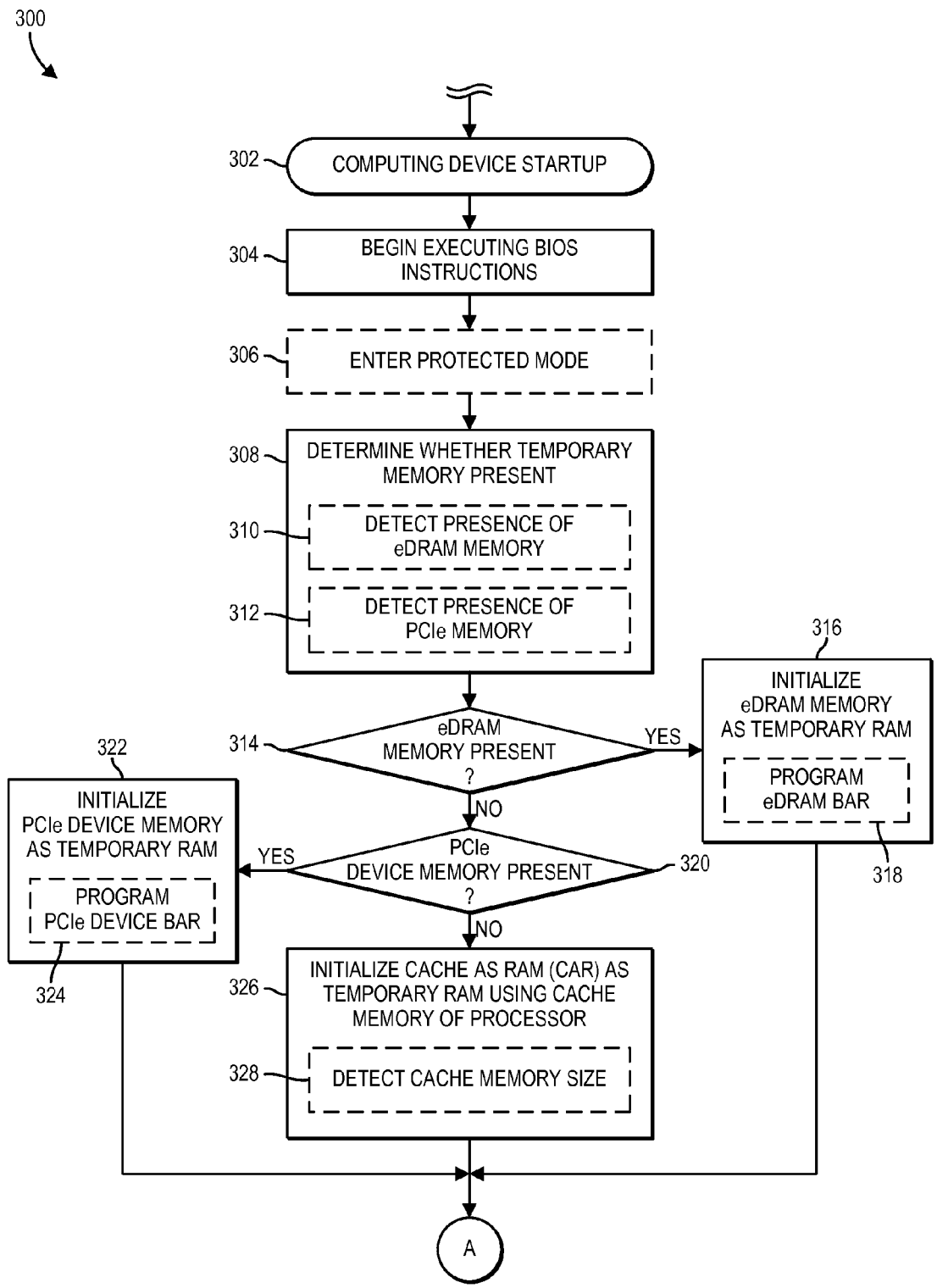
FIGS. 3-4 is a simplified flow diagram of at least one embodiment of a method for pre-memory phase initialization that may be executed by the computing device of FIGS. 1 and 2.
Figure 4:
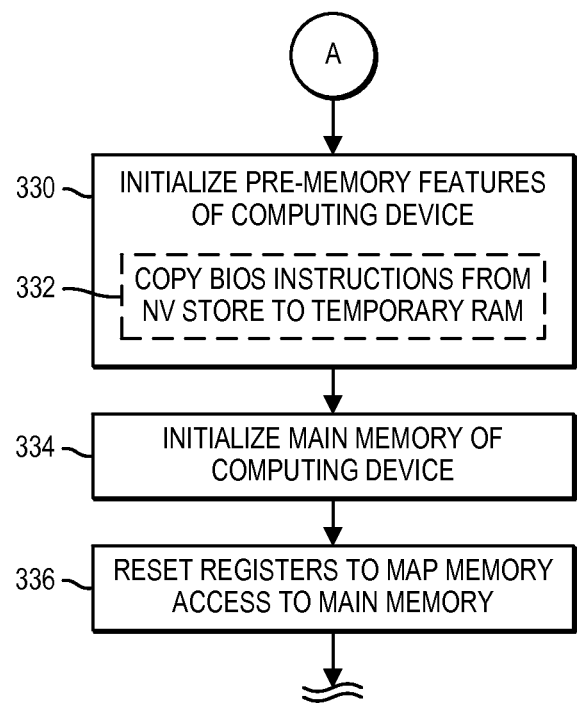

Referring now to FIGS. 3-4, the computing device 102 may execute a method 300 for pre-memory phase initialization. The method 300 begins with block 302 in which the computing device 102 starts up, boots, or otherwise begins an initialization process. In some embodiments, the computing device 102 may be configured to start up, boot, or otherwise start the initialization process in response to a power state change (e.g., turning on the computing device 102, power cycling the computing device 102, etc.) and/or a reset of the computing device 102. In such embodiments, the processor 110 of the computing device 102 determines the reset vector, which is the location of the first BIOS instruction and/or the first firmware instruction 124 to be executed.

In block 304, the processor 110 begins executing the BIOS and/or firmware instructions 124 for booting or otherwise initializing a platform and/or a component of the computing device 102. It should be appreciated that during the initial stages of the booting and/or initialization process, the main memory 118 of the computing device may not yet be fully initialized. As such, the main memory 118 is not available to store code (e.g., subsequent BIOS instructions, commands, etc.) and/or data (e.g., configuration settings, variables, device state data, etc.) required during the initial stages of the booting process. However, in some embodiments, the processor 110 may execute a portion of the BIOS and/or firmware instructions 124 directly from the non-volatile ("NV") store 122.

In some embodiments, in block 306, the processor 110 may enter a protected mode. The protected mode may provide, among other types of functionality, memory management functionality, data protection functionality, multi-tasking functionality, virtual memory functionality, and paging functionality. Additionally or alternatively, it should be appreciated that the processor 110 may be configured to operate in other modes (e.g., real mode, virtual mode, etc.).

In block 308, the processor 110 determines whether the computing device 102 includes temporary memory different from the cache memory 112 of the processor 110. For example, it may be determined whether the computing device 102 includes embedded dynamic random-access memory (eDRAM) 116, which may be internal or external to the processor 110. To do so, in some embodiments, the processor 110 in block 310 may detect the presence of the eDRAM 116. In such embodiments, the processor 110 may examine one or more capability registers of the processor 110 and/or the computing device 102 to detect the presence (or absence) of the eDRAM 116. It should be appreciated that the capability registers may be set or otherwise configured at the time of manufacture of the processor 110, during the booting process, prior to the booting process, and/or at any other time in which a register may be configured. In another example, it may be determined whether the computing device 102 includes Peripheral Component Interconnect Express (PCIe) device memory 128. To do so, in some embodiments, the processor 110 in block 312 may detect the presence of the PCIe device memory 128 embedded in or otherwise communicatively coupled to a PCIe device 126 of the computing device 102. In such embodiments, the processor 110 may examine one or more registers of the PCIe devices 126 and/or the computing device 102 to detect the presence (or absence) of the PCIe device memory 128. The method 300 then advances to decision block 314.

In decision block 314, the processor 110 determines whether the presence of the eDRAM 116 was detected. If, in decision block 314, the processor 110 determines that the eDRAM 116 is present (e.g., the computing device 102 and/or the processor 110 includes the eDRAM 116), the method 300 advances to block 316.

In block 316, the processor 110 initializes the detected eDRAM 116 as temporary random-access memory (RAM). As discussed, the eDRAM 116 may be initialized for storing code and/or data needed during the booting process before the main memory 118 (e.g., the main device memory) has been initialized. In some embodiments, in block 318, the processor 110 may program or otherwise configure a base address register (BAR) associated with the eDRAM 116 and/or one or more BARs associated with another component of the computing device 102. In doing so, it should be appreciated that memory accesses made prior to complete initialization of the main memory 118 will be temporarily redirected to the eDRAM 116. The method 300 then advances to block 330 as discussed in detail below (see FIG. 4).

Referring back to decision block 314, if the processor 110 determines that the eDRAM 116 is not present (e.g., the computing device 102 and the processor 110 do not include the eDRAM 116), the method 300 advances instead to decision block 320. In decision block 320, the processor 110 determines whether the presence of the PCIe device memory 128 was detected. If, in decision block 320, the processor 110 determines that the PCIe device memory 128 is present (e.g., the computing device 102 includes a PCIe device 126 having the PCIe device memory 128), the method 300 advances to block 322.

In block 322, the processor 110 initializes the detected PCIe device memory 128 as temporary RAM. As discussed, the PCIe device memory 128 may be initialized for storing code and/or data needed during the booting process before the main memory 118 has been initialized. In some embodiments, in block 324, the processor 110 may program or otherwise configure a base address register (BAR) associated with the PCIe device memory 128, the PCIe device 126, and/or one or more BARs associated with other components of the computing device 102. In doing so, it should be appreciated that memory accesses made prior to complete initialization of the main memory 118 will be temporarily redirected to the PCIe device memory 128. The method 300 then advances to block 330 as discussed in detail below (see FIG. 4).

Referring back to decision block 320, if the processor 110 determines that the PCIe device memory 128 is not present (e.g., the computing device 102 does not include a PCIe device 126 having the PCIe device memory 128), the method 300 advances instead to block 326. In block 326, the processor 110 initializes all or a portion of the cache memory 112 to be used as Cache as RAM (CAR) 114. As discussed above, the CAR 114 may be used to temporarily store the code and/or data needed during the initial boot process prior to complete initialization of the main memory 118 of the computing device 102. In some embodiments, in block 328, the processor 110 may detect a size of the cache memory 112. To do so, the processor 110 may examine the slices associated with the cache memory 112 and/or one or more configuration registers of the processor 110 and/or the computing device 102. As discussed in more detail below, the processor 110 may execute the BIOS and/or firmware instructions 124 directly from the NV store 122 in embodiments wherein the processor 110 determines that the size of the cache memory 112 is insufficient to store the BIOS and/or firmware instructions 124 required during initial stages of the booting process (e.g., the storage size of the BIOS and/or firmware instructions 124 exceeds the size of the cache memory 112 detected.

Referring now to block 330 (see FIG. 4), the processor 110 may initialize features and/or functionality of the computing device 102 prior to complete initialization of the main memory 118. For example, in some embodiments, the processor 110 may initialize secure boot functionality, debugging functionality, and/or functionality requiring a stack and/or a heap (e.g., functions developed using higher level programming languages, such as C). In some embodiments, in block 332, the processor 110 may copy (e.g., retrieve, move, relocate, transmit, obtain, etc.) the BIOS and/or firmware instructions 124 from the NV store 122 to the initialized temporary RAM (e.g., the eDRAM 116 and/or the PCIe device memory 128). In embodiments wherein the computing device 102 determines that the eDRAM 116 and/or the PCIe device memory 128 is not present, the computing device 102 may instead copy the BIOS and/or firmware instructions 124 to the initialized CAR 114. In either case, the processor 110 of the computing device 102 may execute the copied BIOS and/or firmware instructions 124 from the temporary RAM or the CAR 114 to initialize features and/or functionality of the computing device 102 prior to complete initialization of the main memory 118. It should be appreciated that in embodiments wherein the computing device 102

In block 334, the processor 110 initializes or otherwise completes initialization of the main memory 118 of the computing device 102. Upon completing initialization, the main memory 118 may be made available to store code (e.g., subsequent BIOS instructions, commands, etc.) and/or data (e.g., configuration settings, variables, device state data, etc.) required for completing initialization of the computing device 102. To do so, in block 336, the processor 110 configures the main memory 118 for subsequent memory access. In some embodiments, the processor 110 resets one or more base address registers of the temporary RAM (e.g., the eDRAM 116 or the PCIe device memory 128) and/or other components of the computing device 102. In doing so, it should be appreciated that subsequent memory accesses (e.g., memory accesses made after complete initialization of the main memory 118) will be directed to the main memory 118 instead of the temporary RAM (e.g., the eDRAM 116 or the PCIe device memory 128) or the CAR 114.

EXAMPLES

Illustrative examples of the technologies disclosed herein are provided below. An embodiment of the technologies may include any one or more, and any combination of, the examples described below.

Example 1 includes a computing device for pre-memory phase initialization, the computing device including a boot management module to execute basic input/output system instructions in response to a startup of the computing device; a memory detection module to determine whether the computing device includes a temporary memory different from a cache memory of a processor of the computing device for memory access prior to initialization of a main memory of the computing device; and a memory initialization module to (i) initialize, in response to a determination that the computing device includes temporary memory different from the cache memory, the temporary memory as temporary random-access memory for the memory access prior to initialization of the main memory, and (ii) copy the basic input/output system instructions from a non-volatile memory of the computing device to the temporary random-access memory for execution, wherein the boot management module is further to execute the copied basic input/output system instructions from the temporary random-access memory to boot a component of the computing device.

Example 2 includes the subject matter of Example 1, and wherein in response to a determination that the computing device does not include temporary memory different from the cache memory, the memory initialization module is further to (i) initialize a portion of the cache memory of the processor as Cache as RAM for the memory access prior to initialization of the main memory and (ii) copy the basic input/output system instructions from the non-volatile memory of the computing device to the Cache as RAM, and wherein the boot management module is further to execute the copied basic input/output system instructions from the Cache as RAM to boot the component of the computing device.

Example 3 includes the subject matter of any of Examples 1 and 2, and wherein the memory initialization module is further to detect a size of the cache memory; and wherein the boot management module is further to execute the basic input/output system instructions from the non-volatile memory of the computing device in response to a determination that a size of the basic input/output system instructions exceeds the detected size of the cache memory.

Example 4 includes the subject matter of any of Examples 1-3, and wherein the memory initialization module is further to (i) initialize the main memory of the computing device and (ii) configure the main memory for subsequent memory access.

Example 5 includes the subject matter of any of Examples 1-4, and wherein to configure the main memory for subsequent memory access includes to map the subsequent memory access to the main memory.

Example 6 includes the subject matter of any of Examples 1-5, and wherein to map the subsequent memory access to the main memory includes to reset a register of at least one of the processor or the temporary random-access memory.

Example 7 includes the subject matter of any of Examples 1-6, and wherein to determine whether the computing device includes temporary memory different from the cache memory includes to detect the presence of at least one of an embedded dynamic random-access memory of the computing device or a memory of a Peripheral Component Interconnect Express card of the computing device.

Example 8 includes the subject matter of any of Examples 1-7, and wherein to determine whether the computing device includes temporary memory different from the cache memory includes to detect the presence of an embedded dynamic random-access memory of the computing device; wherein to initialize the temporary memory includes to initialize the embedded dynamic random-access memory of the computing device as the temporary random-access memory for the memory access prior to initialization of the main memory of the computing device; and wherein to copy the basic input/output system instructions includes to copy the basic input/output system instructions from the non-volatile memory to the embedded dynamic random-access memory for execution.

Example 9 includes the subject matter of any of Examples 1-8, and wherein to initialize the embedded dynamic random-access memory of the computing device as temporary random-access memory includes to program a base address register of the embedded dynamic random-access memory for the memory access prior to initialization of the main memory of the computing device.

Example 10 includes the subject matter of any of Examples 1-9, and wherein to determine whether the computing device includes temporary memory different from the cache memory includes to detect the presence of a memory of a Peripheral Component Interconnect Express card of the computing device; wherein to initialize the temporary memory includes to initialize the memory of the Peripheral Component Interconnect Express card as the temporary random-access memory for the memory access prior to initialization of the main memory of the computing device; and wherein to copy the basic input/output system instructions includes to copy the basic input/output system instructions from the non-volatile memory to the memory of the Peripheral Component Interconnect Express card for execution.

Example 11 includes the subject matter of any of Examples 1-10, and wherein to initialize the memory of the Peripheral Component Interconnect Express card as temporary random-access memory includes to program a base address register of the memory of the Peripheral Component Interconnect Express card for the memory access prior to initialization of the main memory of the computing device.

Example 12 includes a method for pre-memory phase initialization of a computing device, the method including determining, by the processor, whether the computing device includes a temporary memory different from a cache memory of the processor for memory access prior to initialization of a main memory of the computing device; wherein in response to determining that the computing device includes temporary memory different from the cache memory: (i) initializing, by the processor, the temporary memory of the computing device as temporary random-access memory for the memory access prior to initialization of the main memory, (ii) copying, by the processor, basic input/output system instructions from a non-volatile memory of the computing device to the temporary random-access memory, and (iii) executing, by the processor, the copied basic input/output system instructions from the temporary random-access memory to boot a component of the computing device.

Example 13 includes the subject matter of Example 12, and wherein in response to determining that the computing device does not include temporary memory different from the cache memory: (i) initializing, by the processor, a portion of the cache memory of the processor as Cache as RAM for the memory access prior to initialization of the main memory, (ii) copying, by the processor, the basic input/output system instructions from the non-volatile memory of the computing device to the Cache as RAM, and (iii) executing, by the processor, the copied basic input/output system instructions from the Cache as RAM to boot the component of the computing device.

Example 14 includes the subject matter of any of Examples 12 and 13, and further including detecting a size of the cache memory; and executing the basic input/output system instructions from the non-volatile memory of the computing device in response to determining that a size of the basic input/output system instructions exceeds the detected size of the cache memory.

Example 15 includes the subject matter of any of Examples 12-14, and further including initializing, by the processor, the main memory of the computing device; and configuring, by the processor, the main memory for subsequent memory access.

Example 16 includes the subject matter of any of Examples 12-15, and wherein configuring the main memory for subsequent memory access includes mapping the subsequent memory access to the main memory.

Example 17 includes the subject matter of any of Examples 12-16, and wherein mapping the subsequent memory access to the main memory includes resetting a register of at least one of the processor or the temporary random-access memory.

Example 18 includes the subject matter of any of Examples 12-17, and wherein determining whether the computing device includes temporary memory different from the cache memory includes detecting the presence of at least one of an embedded dynamic random-access memory of the computing device or a memory of a Peripheral Component Interconnect Express card of the computing device.

Example 19 includes the subject matter of any of Examples 12-18, and wherein determining whether the computing device includes temporary memory different from the cache memory includes detecting the presence of an embedded dynamic random-access memory of the computing device; wherein initializing the temporary memory includes initializing the embedded dynamic random-access memory of the computing device as the temporary random-access memory for the memory access prior to initialization of the main memory of the computing device; wherein copying the basic input/output system instructions includes copying the basic input/output system instructions from the non-volatile memory to the embedded dynamic random-access memory; and wherein executing the copied basic input/output system instructions from the temporary random-access memory includes executing the copied basic input/output system from the embedded dynamic random-access memory.

Example 20 includes the subject matter of any of Examples 12-19, and wherein initializing the embedded dynamic random-access memory of the computing device as temporary random-access memory includes programming a base address register of the embedded dynamic random-access memory for the memory access prior to initialization of the main memory of the computing device.

Example 21 includes the subject matter of any of Examples 12-20, and wherein determining whether the computing device includes temporary memory different from the cache memory includes detecting the presence of a memory of a Peripheral Component Interconnect Express card of the computing device; wherein initializing the temporary memory includes initializing the memory of the Peripheral Component Interconnect Express card as the temporary random-access memory for the memory access prior to initialization of the main memory of the computing device; wherein copying the basic input/output system instructions includes copying the basic input/output system instructions from the non-volatile memory to the memory of the Peripheral Component Interconnect Express card; and wherein executing the copied basic input/output system instructions from the temporary random-access memory includes executing the copied basic input/output system from the memory of the Peripheral Component Interconnect Express card.

Example 22 includes the subject matter of any of Examples 12-21, and wherein initializing the memory of the Peripheral Component Interconnect Express card as temporary random-access memory includes programming a base address register of the memory of the Peripheral Component Interconnect Express card for the memory access prior to initialization of the main memory of the computing device.

Example 23 includes a computing device for pre-memory phase initialization, the computing device including a processor; and a memory having stored therein a plurality of instructions that when executed by the processor cause the computing device to perform the method of any of Examples 12-22.

Example 24 includes one or more machine-readable media including a plurality of instructions stored thereon that in response to being executed result in a computing device performing the method of any of Examples 12-22.

Example 25 includes a computing device for pre-memory phase initialization, the computing device including means for determining whether the computing device includes a temporary memory different from a cache memory of the processor for memory access prior to initialization of a main memory of the computing device; wherein in response to determining that the computing device includes temporary memory different from the cache memory: (i) means for initializing the temporary memory of the computing device as temporary random-access memory for the memory access prior to initialization of the main memory, (ii) means for copying basic input/output system instructions from a non-volatile memory of the computing device to the temporary random-access memory, and (iii) means for executing the copied basic input/output system instructions from the temporary random-access memory to boot a component of the computing device.

Example 26 includes the subject matter of Example 25, and wherein in response to determining that the computing device does not include temporary memory different from the cache memory: (i) means for initializing a portion of the cache memory of the processor as Cache as RAM for the memory access prior to initialization of the main memory, (ii) means for copying the basic input/output system instructions from the non-volatile memory of the computing device to the Cache as RAM, and (iii) means for executing the copied basic input/output system instructions from the Cache as RAM to boot the component of the computing device.

Example 27 includes the subject matter of any of Examples 25 and 26, and further including means for detecting a size of the cache memory; and means for executing the basic input/output system instructions from the non-volatile memory of the computing device in response to determining that a size of the basic input/output system instructions exceeds the detected size of the cache memory.

Example 28 includes the subject matter of any of Examples 25-27, and further including means for initializing the main memory of the computing device; and means for configuring the main memory for subsequent memory access.

Example 29 includes the subject matter of any of Examples 25-28, and wherein the means for configuring the main memory for subsequent memory access includes means for mapping the subsequent memory access to the main memory.

Example 30 includes the subject matter of any of Examples 25-29, and wherein the means for mapping the subsequent memory access to the main memory includes means for resetting a register of at least one of the processor or the temporary random-access memory.

Example 31 includes the subject matter of any of Examples 25-30, and wherein the means for determining whether the computing device includes temporary memory different from the cache memory includes means for detecting the presence of at least one of an embedded dynamic random-access memory of the computing device or a memory of a Peripheral Component Interconnect Express card of the computing device.

Example 32 includes the subject matter of any of Examples 25-31, and wherein the means for determining whether the computing device includes temporary memory different from the cache memory includes means for detecting the presence of an embedded dynamic random-access memory of the computing device; wherein the means for initializing the temporary memory includes means for initializing the embedded dynamic random-access memory of the computing device as the temporary random-access memory for the memory access prior to initialization of the main memory of the computing device; wherein the means for copying the basic input/output system instructions includes means for copying the basic input/output system instructions from the non-volatile memory to the embedded dynamic random-access memory; and wherein the means for executing the copied basic input/output system instructions from the temporary random-access memory includes means for executing the copied basic input/output system from the embedded dynamic random-access memory.

Example 33 includes the subject matter of any of Examples 25-32, and wherein the means for initializing the embedded dynamic random-access memory of the computing device as temporary random-access memory includes means for programming a base address register of the embedded dynamic random-access memory for the memory access prior to initialization of the main memory of the computing device.

Example 34 includes the subject matter of any of Examples 25-33, and wherein the means for determining whether the computing device includes temporary memory different from the cache memory includes means for detecting the presence of a memory of a Peripheral Component Interconnect Express card of the computing device; wherein the means for initializing the temporary memory includes means for initializing the memory of the Peripheral Component Interconnect Express card as the temporary random-access memory for the memory access prior to initialization of the main memory of the computing device; wherein the means for copying the basic input/output system instructions includes means for copying the basic input/output system instructions from the non-volatile memory to the memory of the Peripheral Component Interconnect Express card; and wherein the means for executing the copied basic input/output system instructions from the temporary random-access memory includes means for executing the copied basic input/output system from the memory of the Peripheral Component Interconnect Express card.

Example 35 includes the subject matter of any of Examples 25-34, and wherein the means for initializing the memory of the Peripheral Component Interconnect Express card as temporary random-access memory includes means for programming a base address register of the memory of the Peripheral Component Interconnect Express card for the memory access prior to initialization of the main memory of the computing device.

The invention claimed is:

1. A computing device for pre-memory phase initialization, the computing device comprising:
a boot management module to execute basic input/output system instructions in response to a startup of the computing device;
a memory detection module to detect the presence of a memory of a Peripheral Component Interconnect Express (PCIe) card of the computing device for memory access prior to initialization of a main memory of the computing device; and
a memory initialization module to (i) initialize, in response to detection of the memory of the PCIe card, the memory of the PCIe card as temporary random-access memory for the memory access prior to initialization of the main memory, and (ii) copy the basic input/output system instructions from a non-volatile memory of the computing device to the temporary random-access memory of the PCIe card for execution,
wherein the boot management module is further to execute the copied basic input/output system instructions from the temporary random-access memory of the PCIe card to boot a component of the computing device.

2. The computing device of claim 1, wherein in response to a determination that the computing device does not detect the memory of the PCIe card, the memory initialization module is further to (i) initialize a portion of the cache memory of the processor as Cache as RAM for the memory access prior to initialization of the main memory and (ii) copy the basic input/output system instructions from the non-volatile memory of the computing device to the Cache as RAM, and
wherein the boot management module is further to execute the copied basic input/output system instructions from the Cache as RAM to boot the component of the computing device.

3. The computing device of claim 2, wherein the memory initialization module is further to detect a size of the cache memory; and
wherein the boot management module is further to execute the basic input/output system instructions from the non-volatile memory of the computing device in response to a determination that a size of the basic input/output system instructions exceeds the detected size of the cache memory.

4. The computing device of claim 1, wherein the memory initialization module is further to (i) initialize the main memory of the computing device and (ii) configure the main memory for subsequent memory access.

5. The computing device of claim 4, wherein to configure the main memory for subsequent memory access comprises to map the subsequent memory access to the main memory.

6. The computing device of claim 5, wherein to map the subsequent memory access to the main memory comprises to reset a register of at least one of the processor or the temporary random-access memory of the PCIe card.

7. The computing device of claim 1, wherein to initialize the memory of the Peripheral Component Interconnect Express card as temporary random-access memory comprises to program a base address register of the memory of the Peripheral Component Interconnect Express card for the memory access prior to initialization of the main memory of the computing device.

8. One or more non-transitory, machine-readable media comprising a plurality of instructions stored thereon that in response to being executed by a computing device, cause the computing device to:
- execute basic input/output system instructions in response to a startup of the computing device;
- detect the presence of a memory of a Peripheral Component Interconnect Express (PCIe) card of the computing device for memory access prior to initialization of a main memory of the computing device;
- initialize, in response to detection of the memory of the PCIe card, the memory of the PCIe as temporary random-access memory for the memory access prior to initialization of the main memory;
- copy the basic input/output system instructions from a non-volatile memory of the computing device to the temporary random-access memory of the PCIe card for execution; and
- execute the copied basic input/output system instructions from the temporary random-access memory of the PCIe card to boot a component of the computing device.

9. The one or more non-transitory, machine-readable media of claim 8, wherein in response to a determination that the computing device does not detect the memory of the PCIe card, the plurality of instructions further cause the computing device to:
- initialize a portion of the cache memory of the processor as Cache as RAM for the memory access prior to initialization of the main memory;
- copy the basic input/output system instructions from the non-volatile memory of the computing device to the Cache as RAM; and
- execute the copied basic input/output system instructions from the Cache as RAM to boot the component of the computing device.

10. The one or more non-transitory, machine-readable media of claim 9, wherein the plurality of instructions further cause the computing device to:
- detect a size of the cache memory; and
- execute the basic input/output system instructions from the non-volatile memory of the computing device in response to a determination that a size of the basic input/output system instructions exceeds the detected size of the cache memory.

11. The one or more non-transitory, machine-readable media of claim 8, wherein the plurality of instructions further cause the computing device to:
- initialize the main memory of the computing device; and
- configure the main memory for subsequent memory access.

12. The one or more non-transitory, machine-readable media of claim 11, wherein to configure the main memory for subsequent memory access comprises to map the subsequent memory access to the main memory.

13. The one or more non-transitory, machine-readable media of claim 12, wherein to map the subsequent memory access to the main memory comprises to reset a register of at least one of the processor or the temporary random-access memory of the PCIe card.

14. The one or more non-transitory, machine-readable media of claim 8, wherein to initialize the memory of the Peripheral Component Interconnect Express card as temporary random-access memory comprises to program a base address register of the memory of the Peripheral Component Interconnect Express card for the memory access prior to initialization of the main memory of the computing device.

15. A method for pre-memory phase initialization of a computing device, the method comprising:
- detecting, by the processor, the presence of a memory of a Peripheral Component Interconnect Express (PCIe) card of the computing device for memory access prior to initialization of a main memory of the computing device;
- wherein in response to detection of the memory of the PCIe card, the memory of the PCIe card: (i) initializing, by the processor, the memory of the PCIe card as temporary random-access memory for the memory access prior to initialization of the main memory, (ii) copying, by the processor, basic input/output system instructions from a non-volatile memory of the computing device to the temporary random-access memory of the PCIe card, and (iii) executing, by the processor, the copied basic input/output system instructions from the temporary random-access memory of the PCIe card to boot a component of the computing device.

16. The method of claim 15, wherein in response to determining that the computing device does not detect the memory of the PCIe card (i) initializing, by the processor, a portion of the cache memory of the processor as Cache as RAM for the memory access prior to initialization of the main memory, (ii) copying, by the processor, the basic input/output system instructions from the non-volatile memory of the computing device to the Cache as RAM, and (iii) executing, by the processor, the copied basic input/output system instructions from the Cache as RAM to boot the component of the computing device.

17. The method of claim 16, further comprising:
- detecting, by the processor, a size of the cache memory; and
- executing, by the processor, the basic input/output system instructions from the non-volatile memory of the computing device in response to a determination that a size of the basic input/output system instructions exceeds the detected size of the cache memory.

18. The method of claim 15, further comprising:
- initializing, by the processor, the main memory of the computing device; and
- configuring, by the processor, the main memory for subsequent memory access.

19. The method of claim 18, wherein configuring the main memory for subsequent memory access comprises mapping the subsequent memory access to the main memory.

20. The method of claim 19, wherein mapping the subsequent memory access to the main memory comprises resetting a register of at least one of the processor or the temporary random-access memory of the PCIe card.

21. The method of claim 15, wherein initializing the memory of the Peripheral Component Interconnect Express card as temporary random-access memory comprises programming a base address register of the memory of the Peripheral Component Interconnect Express card for the memory access prior to initialization of the main memory of the computing device.

* * * * *